(12) United States Patent
Rouet

(10) Patent No.: US 9,083,175 B2
(45) Date of Patent: Jul. 14, 2015

(54) PROTECTION CIRCUIT

(71) Applicant: NXP B.V., Eindhoven (NL)

(72) Inventor: Pascal Rouet, Bieville-Beuville (FR)

(73) Assignee: NXP, B.V., Eindhoven (NL)

( * ) Notice: Subject to any disclaimer, the term of this patent is extended or adjusted under 35 U.S.C. 154(b) by 129 days.

(21) Appl. No.: 13/862,997

(22) Filed: Apr. 15, 2013

(65) Prior Publication Data

US 2013/0308232 A1 Nov. 21, 2013

(30) Foreign Application Priority Data

May 16, 2012 (EP) .................................... 12290169

(51) Int. Cl.
*H02H 9/04* (2006.01)
*H04L 25/02* (2006.01)
*G09G 5/00* (2006.01)
*H04L 25/06* (2006.01)

(52) U.S. Cl.
CPC ............... *H02H 9/044* (2013.01); *G09G 5/003* (2013.01); *H04L 25/02* (2013.01); *H04L 25/06* (2013.01); *G09G 2330/04* (2013.01); *G09G 2370/12* (2013.01); *G09G 2380/10* (2013.01); *G09G 2380/12* (2013.01)

(58) Field of Classification Search
CPC ... H04L 25/02; H04L 12/40045; H04L 25/06; H02H 9/044; G09G 5/003
See application file for complete search history.

(56) References Cited

U.S. PATENT DOCUMENTS 5,559,377 A * 9/1996 Abraham ...................... 307/104
7,936,401 B2 * 5/2011 Nakajima et al. ............ 348/723
2007/0296461 A1 * 12/2007 Wong et al. ..................... 326/82
2010/0189120 A1 * 7/2010 Diab et al. ..................... 370/401
2011/0268451 A1 11/2011 Groepl et al.

FOREIGN PATENT DOCUMENTS

EP 2 152 001 A1 2/2010
EP 2 169 658 A2 3/2010

OTHER PUBLICATIONS

NXP, "PESD1LVDS—ESD Protection for In-Vehicle Ultra High-Speed Interfaces", datasheet, rev. 1, 12 pgs. (Oct. 10, 2011).
NXP, application note AN11176, "Automotive Qualifies ESD Protection for LVDS Interfaces", 14 pgs. (Apr. 23, 2012).
Extended European Search Report for European Patent Appln. No. 12290169.7 (Nov. 13, 2012).

* cited by examiner

*Primary Examiner* — Zeev V Kitov

(57) ABSTRACT

HDMI devices coupled to interfaces in environments with high voltages, for example in an automotive vehicle, may be damaged by a short circuit between a cable and a large DC voltage. A protection circuit (100) for the high speed TMDS lines of an HDMI interface includes a DC voltage source (22, 24), a pair of capacitors (C1, C2) and a pair of splitters (12, 14). Each splitter is arranged to split a signal from respective one of the pair of electrical conductors between two signal paths, whereby one of the signal paths is coupled to the voltage source, and a second signal path is coupled to a first terminal of a respective one of the pair of capacitors. A signal received from an HDMI source (26) is split between a first path coupled to a first terminal of a respective capacitor and a second path coupled to the DC voltage source. The protection circuit can block a DC voltage on a cable (28) connected to the second terminals of the respective capacitors while providing a DC image of a receiver so allowing correct operation of a connected HDMI source.

20 Claims, 4 Drawing Sheets

PROTECTION CIRCUIT

CROSS-REFERENCE TO RELATED APPLICATIONS

This application claims the priority under 35 U.S.C. §119 of European patent application no. 12290169.7, filed on May 16, 2012, the contents of which are incorporated by reference herein.

This invention relates to a protection circuit for a High-Definition Multimedia Interface (HDMI).

BACKGROUND OF THE INVENTION

The High-Definition Multimedia Interface (HDMI) is an audio/video data interface suitable for transmitting uncompressed digital data and typically connects audio/video devices such as Camcorders, BluRay and DVD players to other devices such as TVs, and PC monitors. The HDMI specification defines all aspects of the standard such as protocols, signals, electrical interfaces and mechanical requirements. Version 1.4 of the HDMI standard further includes a specification for an automotive connection system which can be used for connecting Audio Visual devices such as DVD players, Blu-Ray video players, and mobile applications to video screens and other vehicle systems using HDMI cabling built into the vehicle.

The HDMI interface has several different groups of transmission lines operating at different frequencies. One group of lines are the very high speed serial lines which use a Transition Minimized Differential Signalling (TMDS) technique originally developed for the digital visual interface (DVI) which can be used to transmit signals up to frequencies of several Gigabits per second. TMDS lines are current-driven lines terminated at the HDMI receiver. A second group is the +5V and HPD lines, used for EDID power and feedback to enable RX detection which are continuous voltage lines. DDC lines which support an I2C interface. A CEC line which is a consumer interface ultra low speed line. A HEAC overlayer used to transmit AC signals on the HPD and unused utility lines which can be used for example to provide an Ethernet and SPDIF interface.

For an Automotive implementation of HDMI systems, an abnormal short circuit may occur to voltage sources in the car which can be for example be 12 Volts, 18 Volts, 24 Volts or higher. However, HDMI interfaces are not designed to tolerate such voltage levels on very high speed serial lines which use a Transition Minimized Differential Signalling (TMDS) technique. TMDS lines on HDMI interfaces may be protected from large transient voltages using an ESD protection device such as the NXP PESD1LVDS IC. However, this will not protect the TMDS lines from a permanent short circuit to a DC voltage source.

This problem may also occur when HDMI systems are used in aircraft to communicate audio and/or video data between devices.

SUMMARY OF THE INVENTION

Various aspects of the invention are defined in the accompanying claims. In a first aspect there is defined a protection circuit for a High Definition Multimedia Interface the protection circuit comprising a pair of electrical conductors for carrying data transmitted as Transition Minimized Differential Signals, a pair of capacitors, each capacitor having a first terminal and a second terminal, wherein the first terminal of each capacitor is coupled to a respective one of the pair of electrical conductors, a voltage source operable to supply a DC voltage, a pair of splitters, each splitter being coupled to a respective one of the pair of TMDS terminals and arranged to split a signal from respective one of the pair of TMDS terminals between at least two signal paths, wherein one of the at least two signal paths is coupled to the voltage source, and a second of the at least two signal paths is coupled to a first terminal of a respective one of the pair of capacitors, and wherein in operation the protection circuit is arranged to couple the second terminal of each of the first and second capacitors to a cable for transmitting HDMI data, and wherein the protection circuit is operable to block a DC voltage in the cable from a High Definition Multimedia Interface source coupled to the pair of electrical conductors and to provide a DC image of a High Definition Multimedia Interface sink device to the High Definition Multimedia Interface source.

The voltage source coupled to the splitter can provide the current conventionally supplied by an HDMI receiver or sink, and act as a DC image to the HDMI source or transmitter. This means that any HDMI sources effectively see a correctly connected HDMI receiver and so will operate properly. Without the splitter, the HDMI source or transmitter cannot otherwise be AC-coupled to the cable and still operate correctly. In particular if the HDMI source is directly AC coupled, Rx sense would not work and consequently many sources would not work correctly in HDCP to manage the HDCP states. The AC coupling between the cable and HDMI source blocks a DC voltage on the cable which can be present for example if there is a short circuit, thereby protecting the HDMI source from the excessive voltage.

In some embodiments the splitter comprises a first resistor is arranged in series between a respective one of the pair of electrical conductors and the first terminal of one of the pair of capacitors, and a second resistor arranged between the first terminal of a respective one of the pair of capacitors and the voltage source.

The arrangement of resistors is operable to split a TMDS signal between the AC path via the capacitors and the path to the voltage source, thereby acting as a DC image of a connected HDMI receiver and also providing termination impedance for a connected HDMI transmitter.

In embodiments the resistance of the second resistor may be twice the resistance of the first resistor. In embodiments the resistance of the first resistor may be between 20 and 30 Ohms and the resistance of the second resistor may be between 40 and 60 Ohms. Other embodiments may have a capacitance value in the range of 0.25 nF to 2.0 nF.

The relationship of the resistance values in the different embodiments and the capacitance values allows an HDMI transmitter and HDMI receiver coupled to the circuit to function correctly according to the HDMI specification with the exception of using the Rx sense function for link management. However, the invention still allows HDMI transmitters and receivers to transmit and receive audio and video data. In embodiments the protection circuit may be coupled to the TMDS outputs of an HDMI source. In embodiments the protection circuit may be included in an integrated circuit having an HDMI source.

Embodiments may include a system comprising the protection further comprising a cable coupled to the second terminal of each of the pair of capacitors the cable having a first end coupled to the second terminal of each of the pair of capacitors and a second end coupled to respective first terminals of a further pair of capacitors; wherein in operation the cable is arranged in series between an HDMI source coupled to the pair of TMDS terminals and an HDMI receiver coupled to the second terminal of the further pair of capacitors, and wherein the system is operable to protect the HDMI source and HDMI receiver from a DC voltage in the cable.

By having a protection circuit at one end of the cable, and further capacitors at the other end DC voltages which may for example be caused by a fault in the cable are blocked from sensitive circuits in the HDMI source/transmitter and HDMI sink/receiver.

Embodiments of an HDMI system may include various sources and/or sinks including an HDMI transmitter, DVD or bluray player, digital media server, vehicle multimedia management unit, and video displays.

Embodiments of the system may be included in a car or aircraft which have DC voltages present at levels which could damage HDMI transmitter or receiver circuits.

BRIEF DESCRIPTION OF THE DRAWINGS

Embodiments of the invention are now described in detail, by way of example only, illustrated by the accompanying drawings in which.

DETAILED DESCRIPTION OF THE EMBODIMENTS

Figure 1:
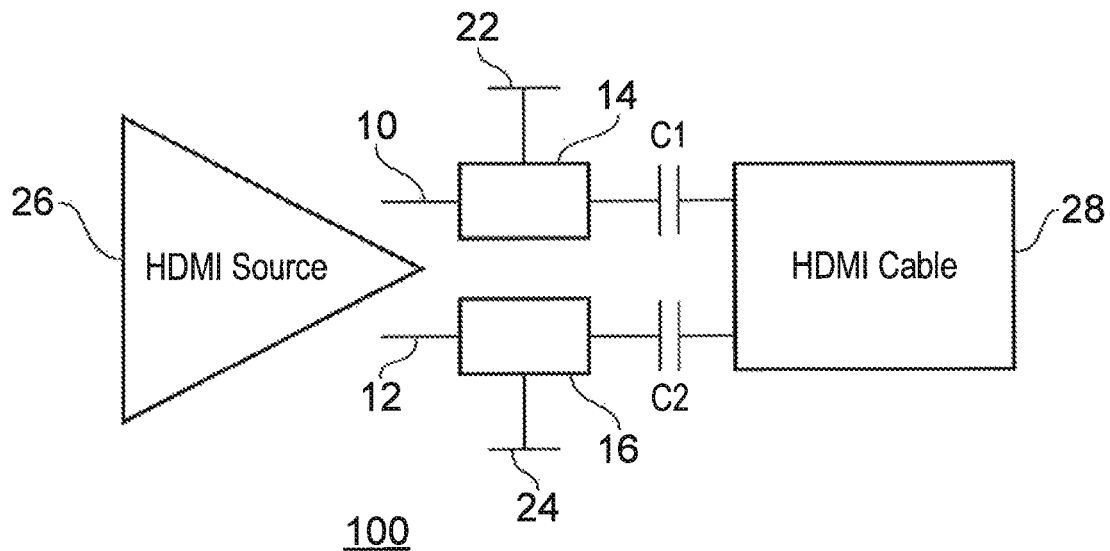
FIG. 1 Shows a protection circuit according to an embodiment.

FIG. 1 shows an example protection circuit 100. First electrical conductor 10 is connected to a first terminal of a first splitter 14. The first splitter 14 has a second splitter terminal connected to first terminal of a first capacitor C1. The first splitter 14 has a third splitter terminal connected to first supply voltage rail 22. Second electrical conductor 12 is connected to a first terminal of a second splitter 16. The second splitter 16 has a second splitter terminal connected to first terminal of a second capacitor C2. The second splitter 16 has a third splitter terminal connected to second supply voltage rail 24.

First capacitor C1 and second capacitor C2 may have a capacitance of 1 nF. The first electrical conductor 10 and the second electrical conductor 12 forms a pair of conductors for carrying data transmitted in the form of a transition minimised differential signal (TMDS) which may be transmitted via an HDMI interface.

In operation, protection circuit 100 behaves as follows. An HDMI source 26 transmits data via an HDMI interface which is coupled to electrical conductors 10 and 12. An HDMI cable 28 is coupled to respective second terminals of capacitors C1 and C2 to carry the high speed TMDS data which may be transmitted at frequencies between 25 MHz and 300 MHz. HDMI source 26 can transmit data at high speed at using TMDS via the pair of electrical conductors 10 and 12 to the HDMI cable 28. The other end of HDMI cable 28 may be connected to an HDMI receiver or sink. In the event that there is a fault in the HDMI cable resulting in a short circuit, resulting in a DC voltage which may be a voltage in excess of 16 volt on the TMDS lines of the cable 28, first capacitor C1 and second capacitor C2 block any DC voltage in a connected cable 28 from reaching the electrical conductors 10 and 12. Thereby a high DC voltage is blocked from reaching the high speed TMDS output of HDMI source 26, which could potentially damaging the HDMI source 26.

In normal operation of an HDMI compliant system, the current required by the HDMI source or transmitter is provided by a connected HDMI receiver or sink. However because capacitors C1 and C2 are located between the HDMI source and the cable 28, the DC component normally provided by an HDMI receiver will not reach the HDMI source 26. Each of the incoming differential TMDS signals are split between a first signal path via the capacitances C1, C2 and a second signal path to the supply voltage rail by first splitter 14 and second splitter 16 respectively. First splitter 14 and second splitter 16 thus provide a DC image of an HDMI receiver or sink, ensuring that HDMI source 26 will function properly. However, the RX sense function cannot be used for link management according to the HDMI standard, because RX sense will always be active, and therefore an HDMI transmitter or source coupled to the protection circuit will not be able to detect whether or not a genuine HDMI receiver is present from the RX Sense signal.

In some embodiments, electrical conductor 10 and electrical conductor 12 may be connected to a pair of TMDS Data or a pair of TMDS Clock connections of an HDMI standard connector. In some embodiments, first supply voltage rail 22 and second supply voltage rail 24 may have a voltage in operation of 3.5 V. In some embodiments, second terminal of capacitor C1 and second terminal of capacitor C2 may be connected to the TMDS data and clock connections of a standard HDMI connector. In some embodiments, electrical conductor 10 and electrical conductor 12 can be TMDS terminals of a HDMI connector.

Figure 2:
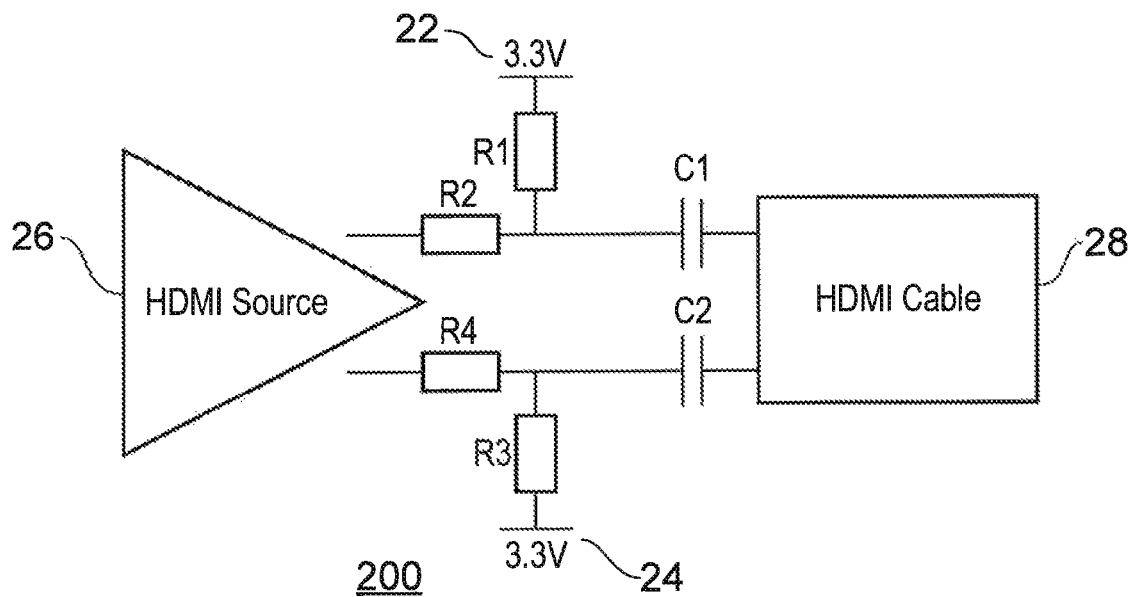
FIG. 2 Illustrates a further protection circuit according to an embodiment.

FIG. 2 shows protection circuit 200 for protecting integrated circuits having an HDMI interface. The supply voltage rail 22 is connected to a first terminal of resistor R1. The second terminal of R1 is connected to a first terminal of a resistor R2 and a first terminal of capacitor C1. The second terminal of R2 is connected to first electrical conductor 10. The supply voltage rail 24 is connected to a first terminal of resistor R3. The second terminal of R3 is connected to a first terminal of a resistor R4 and a first terminal of capacitor C2. The second terminal of R2 is connected to second electrical conductor 12. Resistors R1 and R3 may have a value of 50 ohms. Resistors R2 and R4 may have a value of 25 ohms. R2 and R4 resistance values of 25 ohm may result in an effective AC impedance of 50 Ohms.

In operation an HDMI source 26 which transmits data via an HDMI interface may be coupled to electrical conductors 10 and 12. An HDMI cable 28 may be coupled to respective second terminals of capacitors C1 and C2 to carry the high speed TMDS data which may be transmitted at frequencies above 25 MHz. HDMI source 26 can transmit data at high speed at using TMDS via the pair of electrical conductors 10 and 12 to the HDMI cable 28. The other end of HDMI cable 28 may be connected to an HDMI receiver or sink. In the event that there is a fault in the HDMI cable resulting in a short circuit, a DC voltage which may be a voltage in excess of 16 V may be present on the TMDS lines of the cable 28. First capacitor C1 and second capacitor C2 block any DC voltage in a connected cable 28 from reaching the electrical conductors 10 and 12. Thereby a high DC voltage is blocked from reaching the high speed TMDS output of HDMI source 26, which could potentially damage the HDMI source 26.

The arrangement of R1 and R2 may act as a first signal splitter to split a signal carried by first electrical conductor 10 between a first signal path to the supply voltage rail 22 and a second signal path to capacitor C1. The arrangement of R3 and R4 may act as a second signal splitter to split a signal carried by second electrical conductor 12 between a first signal path to the supply voltage rail 24 and a second signal path to capacitor C2. By splitting the signal between the AC path to a capacitor and a path to DC voltage the arrangement of resistors R1,R2,R3 and R4 can act as an image of an HDMI receiver or sink, ensuring that HDMI source 26 will function properly. However, the RX sense function cannot be used for link management according to the HDMI standard, because RX sense will always be active. Therefore an HEM transmitter or source coupled to the protection circuit will not be able to detect whether or not a genuine HDMI receiver is present from the RX Sense signal.

Figure 3:
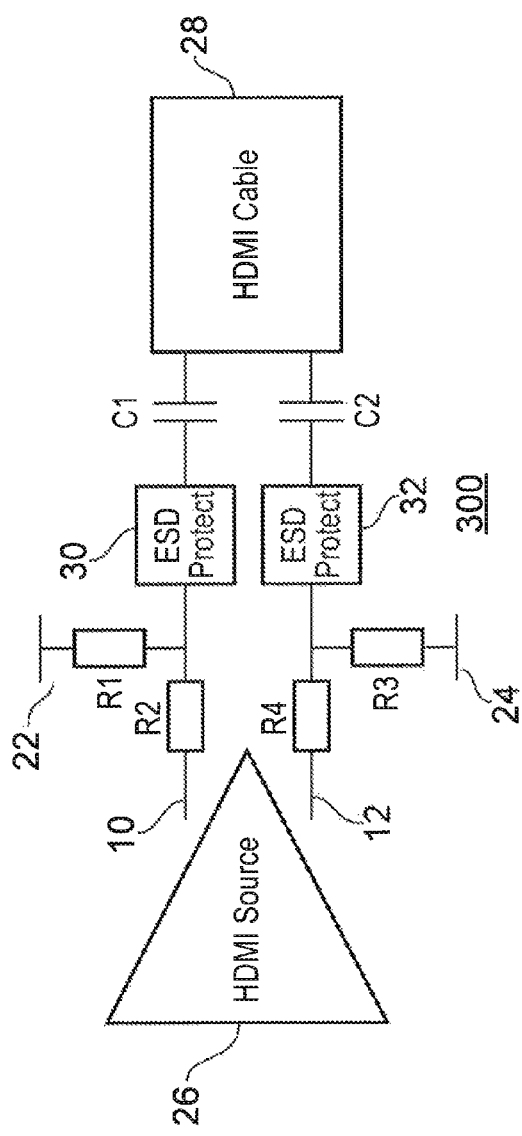
FIG. 3 Shows another protection circuit according to an embodiment.

FIG. 3 shows protection circuit 300 for protecting integrated circuits having an HDMI interface. The supply voltage rail 22 is connected to a first terminal of resistor R1. The second terminal of R1 is connected to a first terminal of a resistor R2 and a first terminal of a first electro-static discharge (ESD) protection circuit 30. A second terminal of first ESD protection circuit 30 is connected to first terminal of capacitor C1. The second terminal of R2 is connected to first electrical conductor 10.

The supply voltage rail 24 is connected to a first terminal of resistor R3. The second terminal of R3 is connected to a first terminal of resistor R4 and a first terminal of a second electro-static discharge (ESD) protection circuit 32. Second terminal of second ESD protection circuit 32 is connected to first terminal of capacitor C2. The second terminal of R4 is connected to second electrical conductor 12.

The first ESD protection circuit 30 and second ESD protection circuit 30 may be implemented for example by the NXP PESD1LVDS IC device or other suitable ESD circuits known to the skilled person.

Resistors R1 and R3 may have a value of 50 ohms. Resistors R2 and R4 may have a value of 25 ohms. Capacitors C2 and C2 may have a value of 1 nF. First supply rail 22 and second supply rail 24 may have a voltage in operation of 3.5 volts.

In operation an HDMI source 26 which transmits data via an HDMI interface may be coupled to electrical conductors 10 and 12. An HDMI cable 28 may be coupled to respective second terminals of capacitors C1 and C2 to carry the high speed TMDS data. HDMI source 26 can transmit data at high speed at using TMDS via the pair of electrical conductors 10 and 12 to the HDMI cable 28. The other end of HDMI cable 28 may be connected to an HDMI receiver or sink. In the event that there is a fault in the HDMI cable resulting in a short circuit, a DC voltage which may be a voltage in excess of 16 V may be present on the TMDS lines of the cable 28. First capacitor C1 and second capacitor C2 block any DC voltage in a connected cable 28 from reaching the electrical conductors 10 and 12. Thereby a high DC voltage is blocked from reaching the high speed TMDS output of HDMI source 26, which could potentially damaging the HDMI source 26. First ESD protection circuit 30 and second ESD protection circuit block large transient voltages from reaching the electrical conductors 10 and 12 and hence a pair of TMDS outputs from an HDMI source 26 is protected from large transient voltages.

R1 and R2 act as a splitter for an HDMI source 26 which may be coupled to electrical connector 10. Resistor is R3 and R4 act as a splitter for an HDMI source 26 coupled to electrical connector 12. Resistors R1, R2 and R3, R4 may provide a DC image of an HDMI receiver or sink 38, ensuring that HDMI source 26 will function properly.

Figure 4:
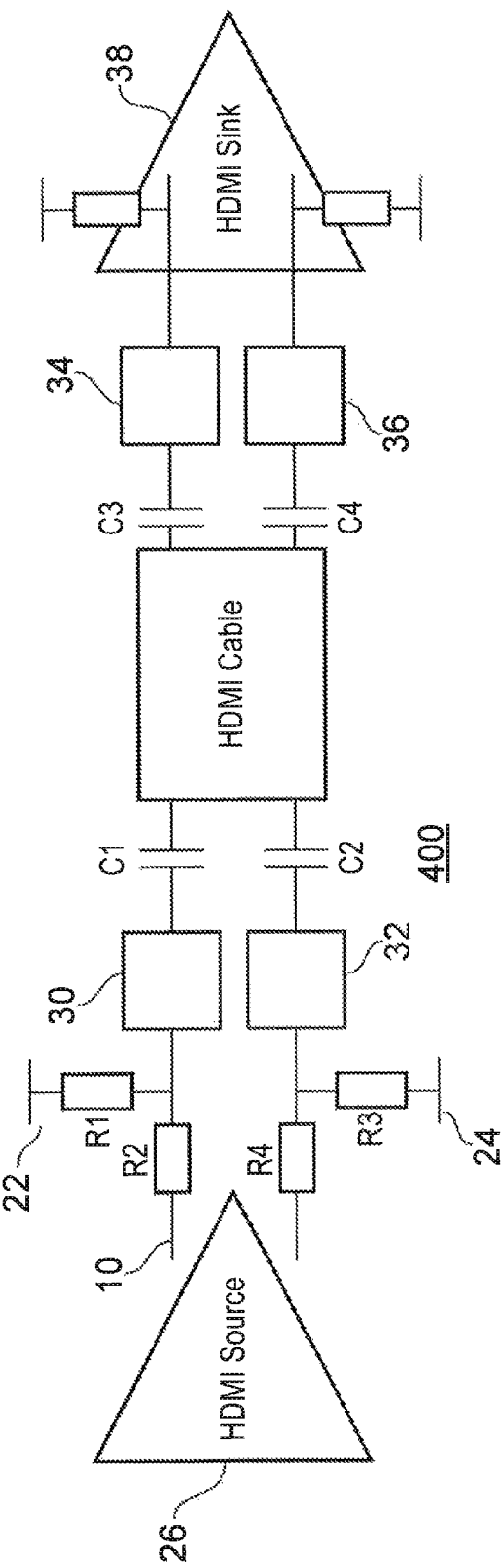
FIG. 4 illustrates a HDMI connection system including a protection circuit according to an embodiment.

FIG. 4 illustrates an HDMI transmission system 400 according to an embodiment. The supply voltage rail 22 is connected to a first terminal of resistor R1. The second terminal of R1 is connected to a first terminal of a resistor R2 and a first terminal of a first electro-static discharge (ESD) protection circuit 30. The second terminal of first ESD protection circuit is connected to first terminal of capacitor C1. The second terminal of R2 is connected to first electrical conductor 10. The supply voltage rail 24 is connected to a first terminal of resistor R3. The second terminal of R3 is connected to a first terminal of resistor R4 and a first terminal of a second electro-static discharge (ESD) protection circuit 32. The second terminal of second ESD protection circuit 32 is connected to the first terminal of capacitor C2.

The second terminal of capacitor C1 is connected to a first end of HDMI cable 28. The second terminal of capacitor C2 to is connected to a first end of HDMI cable 28. The other end of HDMI cable 28 is connected to a first terminal of capacitor C3 and first terminal of capacitor C4. The second terminal of capacitor C3 is connected to a first terminal of third ESD protection circuit 34. The second terminal of capacitor C4 is connected to a first terminal of fourth ESD protection circuit 36.

The term HDMI cable can be considered to refer to any cabling having a number of conductors which is suitable for carrying data transmitted according to the HDMI standard. In operation an HDMI source 26 which transmits data via an HDMI interface may be coupled to electrical conductors 10 and 12. HDMI source 26 can transmit data at high speed at using TMDS via the pair of electrical conductors 10 and 12 to the HDMI cable 28. Second terminal of third and fourth ESD circuits 34 and 36 may be connected to an HDMI receiver or sink 38. In the event that there is a fault in the HDMI cable resulting in a short circuit, a DC voltage which may be a voltage in excess of 16 V may be present on the TMDS lines of the HDMI cable 28. First capacitor C1 and second capacitor C2 block any DC voltage in the cable 28 from reaching the electrical conductors 10 and 12, and capacitor C3 and capacitor C4 block a DC voltage from reaching the third ESD protection circuit 34 and fourth ESD protection circuit 36 respectively. Thereby a high DC voltage is blocked from reaching a high speed TMDS output of HDMI source 26 or a high speed TMDS input of an HDMI sink 38. First and second ESD protection circuits 30 and 32 block large transient voltages from reaching the electrical conductors 10 and 12, protecting a pair of TMDS outputs of an HDMI source 26 connected to electrical conductors 10 and 12. ESD protection circuits 34 and 36 block large transient voltages reaching TMDS inputs of an HDMI sink connected to the second terminals of ESD circuits 34 and 36.

R1 and R2 may act as a splitter for an HDMI source 26 which may be coupled to electrical connector 10. Resistor is R3 and R4 act as a splitter for an HDMI source 26 coupled to electrical connector 12. Resistors R1, R2 and R3, R4 may provide a DC image of an HDMI receiver or sink 38, ensuring that HDMI source 26 will function properly.

Figure 5:
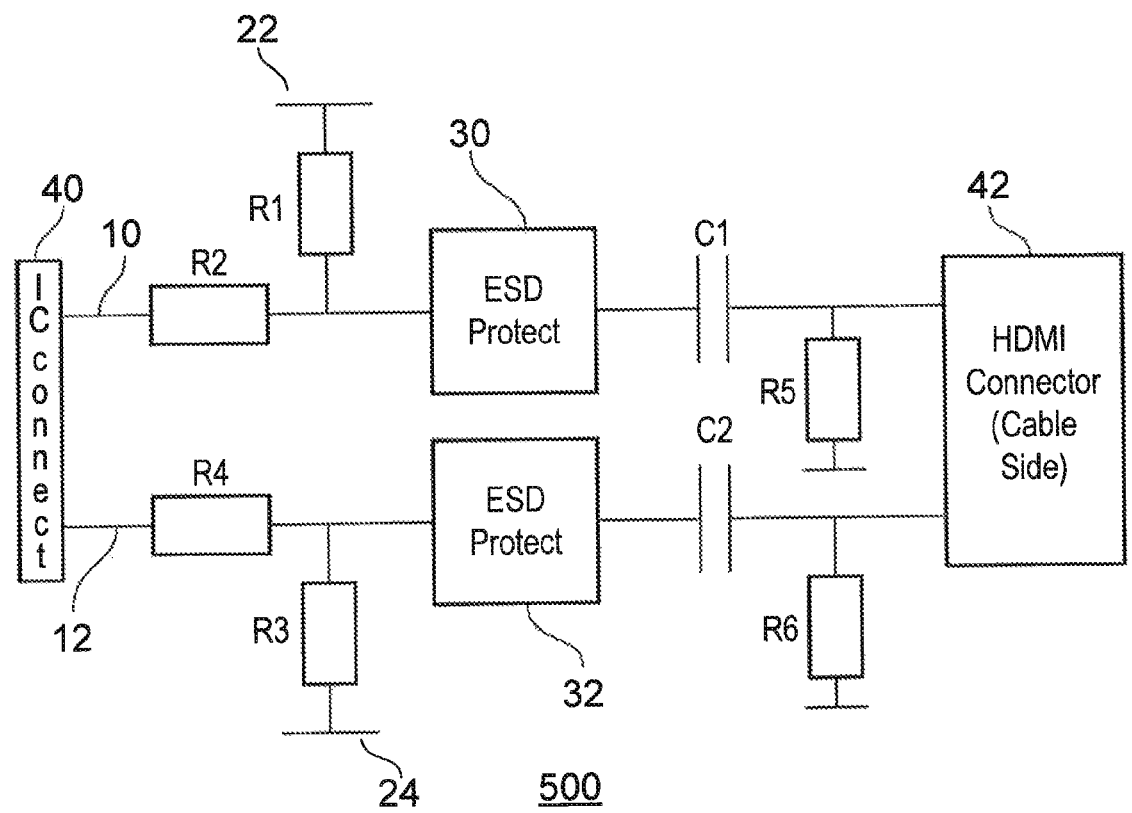
FIG. 5 shows a protection circuit for connection to either an HDMI transmitter or receiver according to an embodiment.

FIG. 5 shows an adaptor circuit 500 which can be used to protect either an HDMI source or HDMI sink from DC and transient voltages on the TMDS connections according to an embodiment.

The supply voltage rail 22 is connected to a first terminal of resistor R1. The second terminal of R1 is connected to a first terminal of a resistor R2 and a first terminal of a first electro-static discharge (ESD) protection circuit 30. Second terminal of first ESD protection circuit 30 is connected to first terminal of capacitor C1. The supply voltage rail 24 is connected to a first terminal of resistor R3. The second terminal of R3 is connected to a first terminal of a resistor R4 and a first terminal of capacitor C2. The second terminal of R3 is connected to a first terminal of resistor R4 and a first terminal of a second electro-static discharge (ESD) protection circuit 32. The second terminal of second ESD protection circuit 32 is connected to first terminal of capacitor C2. The second terminal of R2 is connected to first electrical conductor 10. The second terminal of R4 is connected to second electrical conductor 12.

First electrical conductor 10 and second electrical conductor 12 may be connected to a pair of TMDS data terminals on a HDMI connector 40 for connecting to an HDMI source or sink. Second terminal of capacitor C1 is connected to first terminal of resistor R5 and a TMDS terminal of HDMI connector 42 for connecting to a cable. Second terminal of resistor R5 may be connected to a ground potential. R5 may have a value of 10 KOhm. Second terminal of capacitor C2 may be connected to first terminal of resistor R6 and a TMDS data terminal of HDMI connector 42 for connecting to a cable. Second terminal of resistor R6 may be connected to a ground potential. R6 may have a value of 10 KOhm.

Resistors R1 and R3 may have a value of 50 ohms. Resistors R2 and R4 may have a value of 25 ohms. Capacitors C2 and C2 may have a value of 1 nF. First supply rail 22 and second supply rail 24 may have a supply voltage of 3.5 volts when operating. In other embodiments first supply rail 22 and second supply rail 24 may have a supply voltage in the range of 3 to 3.5 volts when operating. In further embodiments R1 and R3 may have resistance values in the range of 40 to 60 ohms and R2 and R4 may have a value in the range of 20 to 30 Ohms. Further combinations of resistance values may be used provided the source voltage does not fall below 2 volts. This may be achieved in embodiments where R1+R2 is less than or equal to 150 Ohms and R3+R4 is less than or equal to 150 Ohms for supply voltage value of 3.3 volts.

In operation an HDMI source or sink may be connected to HDMI connector 40. An HDMI cable 28 may be coupled to HDMI connector 42 carry the high speed TMDS data. In the event that there is a fault in the HDMI cable resulting in a short circuit, a DC voltage which may be a voltage in excess of 16 V may be present on the TMDS lines of the cable 28. First capacitor C1 and second capacitor C2 block any DC voltage in a connected cable 28 from reaching the electrical conductors 10 and 12. Thereby a high DC voltage is blocked from reaching the high speed TMDS terminals of HDMI connector 40, which could potentially damage a connected HDMI source or sink. First ESD protection circuit 30 and second ESD protection circuit 32 block large transient voltages from reaching the electrical conductors 10 and 12 and thereby protect TMDS terminals on a HDMI source or sink connected to connector 40.

The resistors R1, R2 and R3 and R4 can act as splitters and provide an image of an HDMI receiver or sink, ensuring that an HDMI source connected to HDMI connector 40 will function properly. In embodiments HDMI connector 40 and HDMI connector 42 may be standard HDMI connectors or any suitable arrangement for connecting to a cable or other HDMI interface.

Figure 6:
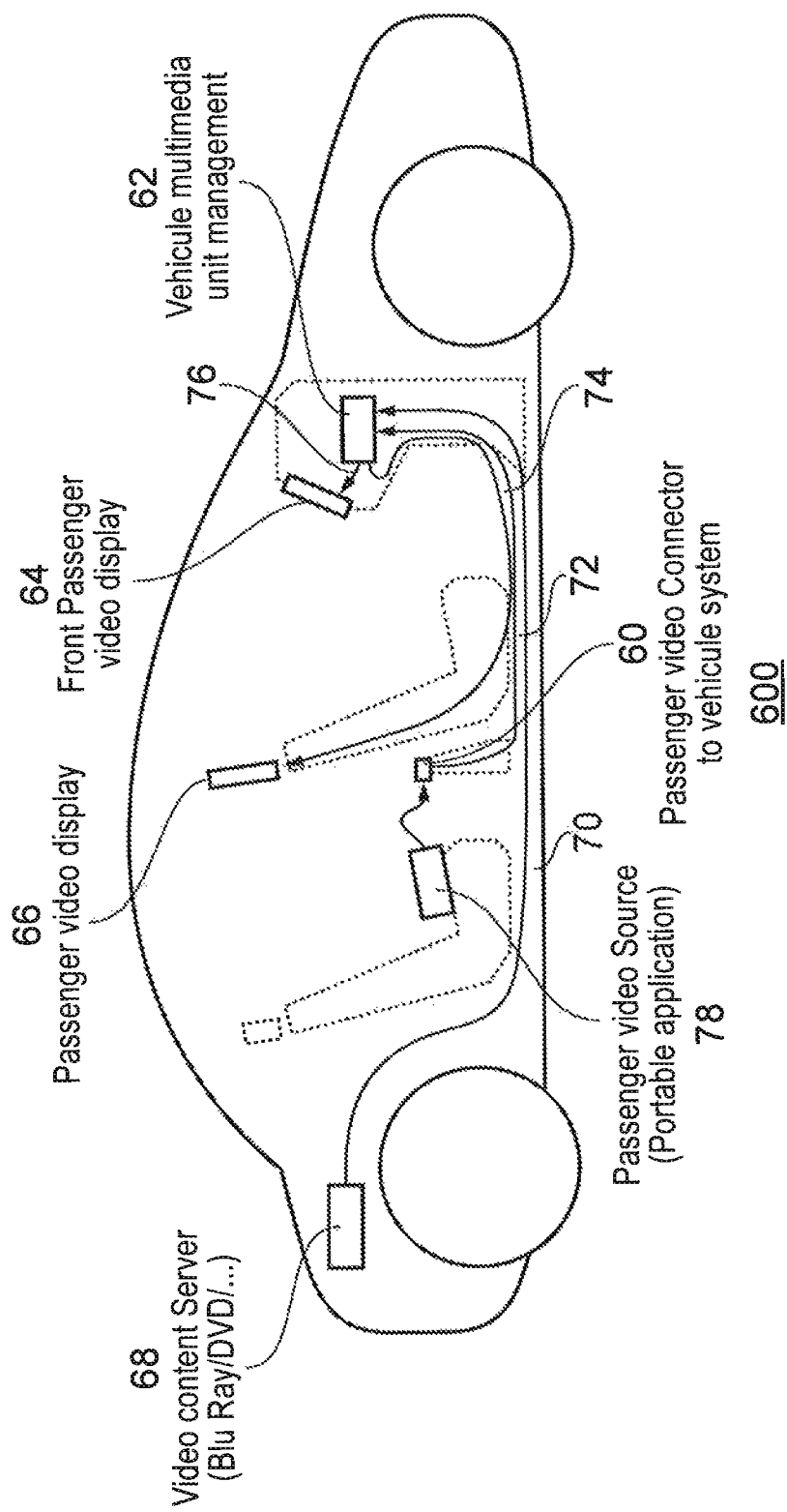
FIG. 6 Illustrates a motor vehicle with an HDMI connection system according to an embodiment.

FIG. 6 shows a motor vehicle including an HDMI transmission system 600. Passenger video connector 60 may include a protection circuit 500. Vehicle multimedia unit management 62 includes HDMI transmit and receive interfaces each of which may include protection circuit 500. Front passenger video display 64 includes HDMI receive interfaces each of which may be protected by protection circuit 500. Rear passenger video display 66 includes HDMI receive interfaces each of which may be protected by protection circuit 500. Video content server 68 which may be a Blu-ray player a DVD player includes an HDMI transmitter which may include protection circuit 500.

Video content server 68 may be connected to the vehicle multimedia management unit 62 by HDMI cable 70. Passenger video connector 60 may be connected to the vehicle multimedia management unit 62 by HDMI cable 72. Passenger video display 66 may be connected to vehicle multimedia management unit 62 by HDMI cable 74. Front passenger video display 64 may be connected to a vehicle multimedia management unit 62 by HDMI cable 76.

In operation multimedia content is transmitted from the multimedia sources which may be video content server 68, or may be a portable video source 78 coupled to passenger video connector 72 to front passenger video display 64 and passenger video display 66. Vehicle multimedia management unit 62 controls the routing of HDMI data from video content sources to the video displays.

In other embodiments vehicle multimedia unit management 62, passenger video display 64, passenger video display 66, video content server 68 may include other embodiments of the HDMI protection circuit, for example protection circuit 100 may be connected to an HDMI transmit interface of vehicle multimedia unit management 62.

From reading the present disclosure, other variations and modifications will be apparent to the skilled person. Such variations and modifications may involve equivalent and other features which are already known in the art of protection circuits for HDMI and which may be used instead of, or in addition to, features already described herein. For example, some protection circuits may be included in aircraft which use HDMI to distribute multimedia content. In some embodiments, the protection circuit may be included on an integrated circuit or may be included within an integrated circuit package. In other embodiments, further protection circuitry known to the skilled person may be added to protect the other terminals of the HDMI interface for the low speed signals, which are for example the CEC, SCL and HEAC signals defined in the HDMI standard. Additional protection circuits may be used to protect each pair of TMDS data or pair of TMDS clock lines present on an HDMI interface.

Embodiments of a protection circuit for the high speed TMDS lines of an HDMI interface may include a DC voltage source, a pair of capacitors and a pair of splitters. Each splitter arranged to split a signal from respective one of the pair of electrical conductors between two signal paths, whereby one of the signal paths is coupled to the voltage source, and a second signal path is coupled to a first terminal of a respective one of the pair of capacitors. A signal received from an HDMI source may be split between a first path coupled to a first terminal of a respective capacitor and a second path coupled to the DC voltage source. The protection circuit can block a DC voltage on a cable connected to the second terminals of the respective capacitors while providing a DC image of a receiver so allowing correct operation of a connected HDMI source.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A protection circuit for a High Definition Multimedia Interface (HDMI), the protection circuit comprising:
a pair of electrical conductors for carrying data transmitted as Transition Minimized Differential Signals,
a pair of capacitors, each said capacitor having a first terminal and a second terminal, wherein the first terminal of each said capacitor is coupled to a respective one of the pair of electrical conductors,
a voltage source operable to supply a DC voltage,
a pair of splitters, each said splitter being coupled to a respective one of the pair of electrical conductors and arranged to split a signal from a respective one of the pair of electrical conductors between at least two signal paths, wherein one of the at least two signal paths is coupled to the voltage source, and a second of the at least two signal paths is coupled to a first terminal of a respective one of the pair of capacitors, and wherein
in operation the protection circuit is arranged to couple the second terminal of each of the pair of capacitors to a cable for transmitting HDMI data, and wherein the protection circuit is operable to block a DC voltage in the cable from a High Definition Multimedia Interface source coupled to the pair of electrical conductors.

2. The protection circuit according to claim 1, wherein
each of the pair of electrical conductors is configured and arranged to receive the signal from an HDMI transmitter and provide the signal to the pair of splitters, the HDMI transmitter being configured and arranged to provide the signals to the pair of electrical conductors in response to detecting a DC voltage characteristic of an HDMI receiver on the pair of electrical conductors;
the splitters are further configured and arranged to provide a DC voltage characteristic of an HDMI receiver on the pair of electrical conductors; and
the splitters include:
a first resistor arranged in series between a respective one of the pair of electrical conductors and the first terminal of one of the pair of capacitors, and
a second resistor arranged between the first terminal of a respective one of the pair of capacitors and the voltage source.

3. The protection circuit according to claim 2, wherein a value of the second resistor is twice a value of the first resistor.

4. The protection circuit according to claim 2, wherein a value of the first resistor is between 20 and 30 Ohms and a value of the second resistor is between 40 and 60 Ohms.

5. The protection circuit according to claim 2, wherein the supply voltage is in the range of 3 to 3.6 volts.

6. The protection circuit of claim 1, wherein the capacitance value is in a range of 0.25 nF to 2.0 nF.

7. The protection circuit according to claim 1, further comprising an ESD circuit arranged between the first terminal of each of the pair of capacitors and each of the pair of electrical conductors.

8. An HDMI source comprising at least one protection circuit according to claim 1, wherein at least one of a pair of TMDS outputs of the HDMI source are coupled to the respective pair of electrical conductors of the at least one protection circuit.

9. The HDMI source of claim 8, wherein the at least one of a pair of TMDS outputs is operable to output one of a differential data signal a differential clock signal.

10. An integrated circuit comprising the HDMI source according to claim 8.

11. A system for transmitting High Definition Multimedia Interface (HDMI) data, the system comprising:
the protection circuit of claim 1; and
a cable coupled to the second terminal of each of the pair of capacitors, the cable having a first end coupled to the second terminal of each of the pair of capacitors and a second end coupled to respective first terminals of a further pair of capacitors, wherein in operation the cable is arranged in series between an HDMI source coupled to the pair of electrical conductors and an HDMI receiver coupled to the second terminal of the further pair of capacitors, and wherein the system is operable to protect the HDMI source and HDMI receiver from a DC voltage in the cable.

12. The system of claim 11, further comprising an HDMI source coupled to the pair of electrical conductors and an HDMI receiver coupled to the second terminal of the further pair of capacitors.

13. The system of claim 12, wherein the HDMI source comprises at least one of a portable device, an integrated circuit comprising an HDMI transmission circuit, a DVD player, a Blu-Ray player, and a digital media server, and the HDMI receiver comprises at least one of a video display, and an integrated circuit comprising an HDMI receiver circuit.

14. A motor vehicle comprising the system of claim 11.

15. An aircraft comprising the system of claim 11.

16. A system, comprising:
a High Definition Multimedia Interface (HDMI) connector;
a transmitter circuit having a set of outputs and configured and arranged to output a data signal in response to detecting a direct current (DC) voltage at one of the set of outputs; and
a protection circuit that AC-couples (alternating current) the transmitter circuit to the HDMI connector and is configured and arranged to:
transfer the data signal from the set of outputs of the transmitter circuit to the HDMI connector,
block transfer of DC voltage from the HDMI connector to transmitter, thereby protecting the transmitter from high voltage on an HDMI cable connected to the HDMI connector; and
provide the DC voltage from voltage source to the one of the set of outputs of the transmitter circuit, thereby prompting the transmitter circuit to transmit the data signal.

17. The system of claim 16, wherein the protection circuit includes:
a pair of electrical conductors configured and arranged to receive the data signal from set of outputs;
a pair of capacitors, each having a respective first terminal coupled to the HDMI connector and having a respective second terminal; and a coupling circuit configured and arranged to communicatively couple each of the pair of electrical conductors to the second terminal of a respective one of the pair of capacitors.

18. The system of claim 17, wherein:

the capacitors are configured and arranged to inhibit transfer of DC voltage from the HDMI connector to the pair of electrical conductors; and the coupling circuit is configured and arranged to provide the DC voltage characteristic of an HDMI receiver to the pair of electrical conductors.

19. The system of claim 18, wherein the coupling circuit, includes a pair of splitters, each being coupled to a respective one of the pair of electrical conductors and configured and arranged to split a signal from the respective one of the pair of electrical conductors between at least two signal paths including a first path to a voltage source and a second path to the second terminal of a respective one of the pair of capacitors.

20. The system of claim 18, wherein the coupling circuit further includes an electrostatic discharge (ESD) circuit coupled to the second terminals of the pair of capacitors.

* * * * *